April 21, 1964

J. L. BURG 3,129,613

RECIPROCATING FEED DEVICE FOR MACHINE TOOLS

Filed Sept. 1, 1961

INVENTOR.
JOSEPH L. BURG
BY
Flam and Flam
ATTORNEYS.

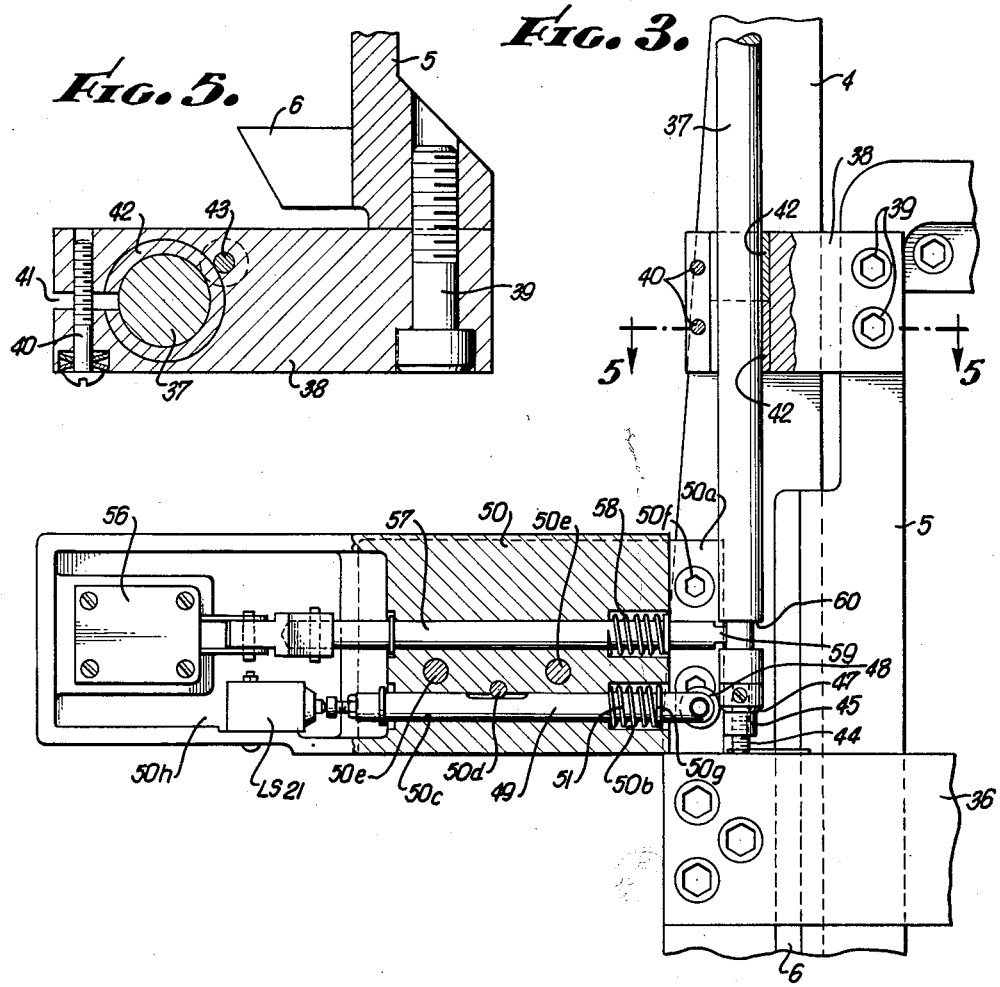
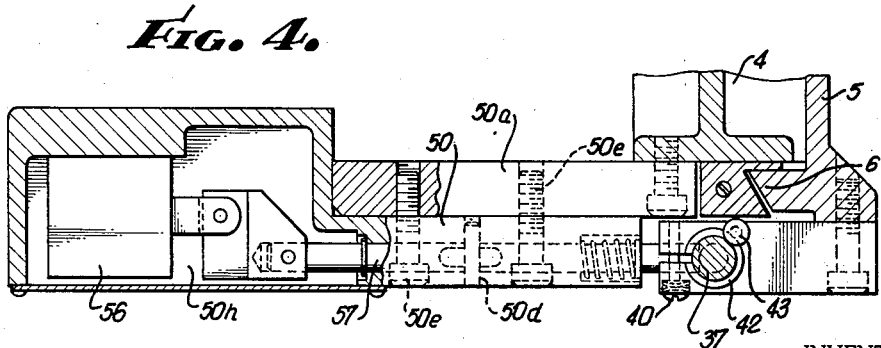

April 21, 1964  J. L. BURG  3,129,613
RECIPROCATING FEED DEVICE FOR MACHINE TOOLS
Filed Sept. 1, 1961  4 Sheets-Sheet 3
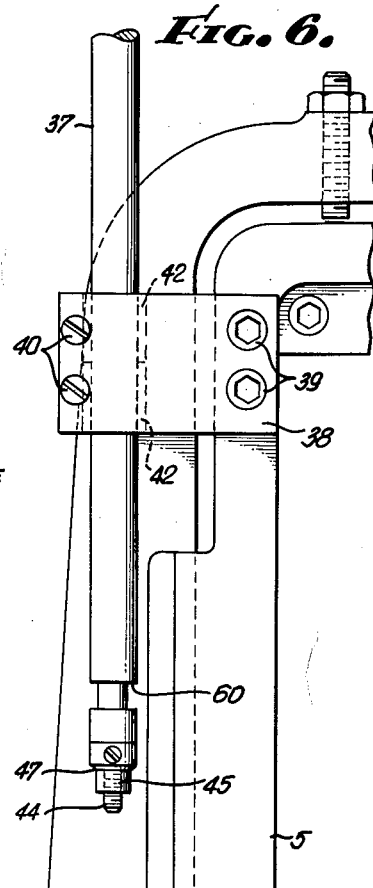
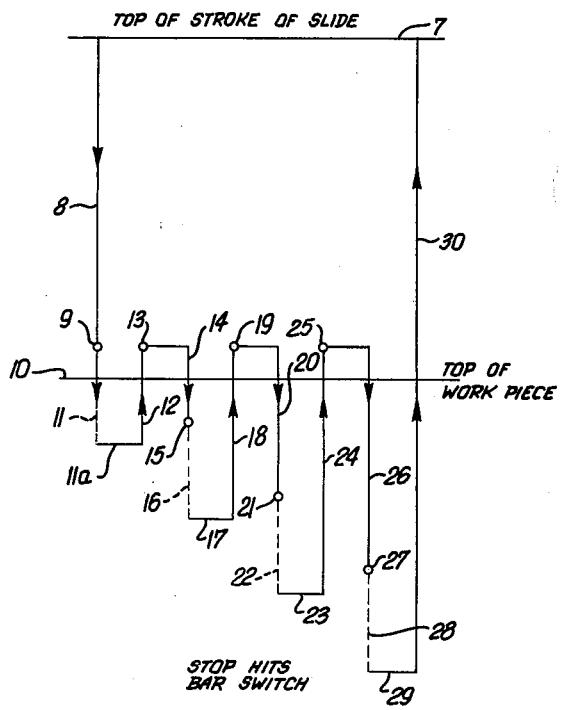
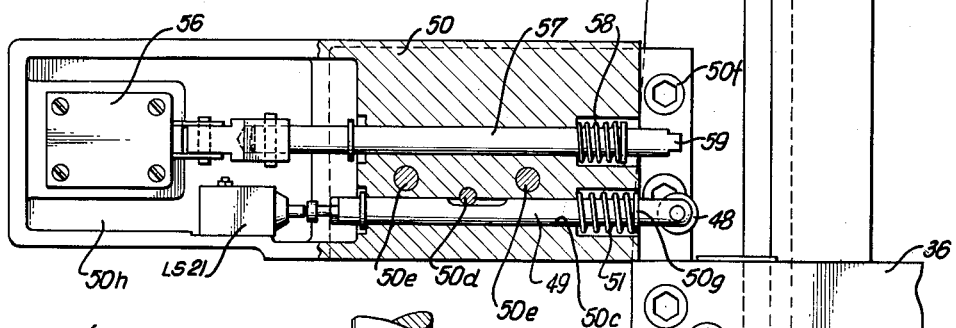
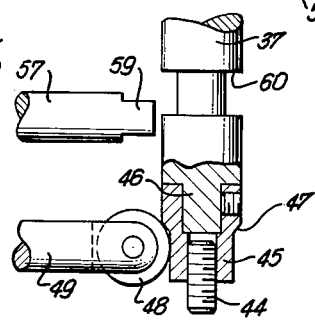
INVENTOR.
JOSEPH L. BURG
BY
Flam and Flam
ATTORNEYS.

United States Patent Office 3,129,613
Patented Apr. 21, 1964

3,129,613
RECIPROCATING FEED DEVICE FOR
MACHINE TOOLS
Joseph L. Burg, Los Angeles, Calif., assignor to Burgmaster Corporation, Los Angeles, Calif., a corporation of California
Filed Sept. 1, 1961, Ser. No. 135,673
1 Claim. (Cl. 77—25)

This invention relates to machine tools, and particularly to those utilzing rotary tools. Such rotary tools may be drills and reamers.

When the depth of the hole drilled by the machine is not large, the problem of keeping the drill clear of chips is not a pressing one. However, when deep holes are to be formed, the tool may have to be lifted from the hole several times to permit the chips to fall away from the tool. If this is not done, intolerable irregularities in the completed hole are likely to be produced.

It is one of the objects of this invention to provide a control that will cause a reversal of the feed after an increment of operation, to lift the tool entirely out of the work, and then to effect a forward feed, the process being repeated until the desired depth is obtained.

It is another object of this invention to provide a fast withdrawal of the tool, while ensuring that slow feed will occur only when the tool approaches the bottom of the partially drilled hole.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claim.

Referring to the drawings:

FIG. 3 is an enlarged fragmentary view, partly in vertical section, and illustrating some of the details of the mechanism, the elements being illustrated in the position of FIG. 1;

FIG. 4 is a view, partly in section, of the right-hand portion of the apparatus illustrated in FIG. 3;

FIG. 5 is a further enlarged detail sectional view, taken along a plane corresponding to line 5—5 of FIG. 3;

FIG. 6 is a view similar to FIG. 3, but illustrating that part of the sequence of drilling which occurs later than that corresponding to FIGS. 1 or 3;

FIG. 7 is a further enlarged detail view, partly in section, and illustrating the completion of one of several down movements of the tool;

FIG. 8 is a diagram explaining the manner in which the reciprocating feed operates.

Figure 1:
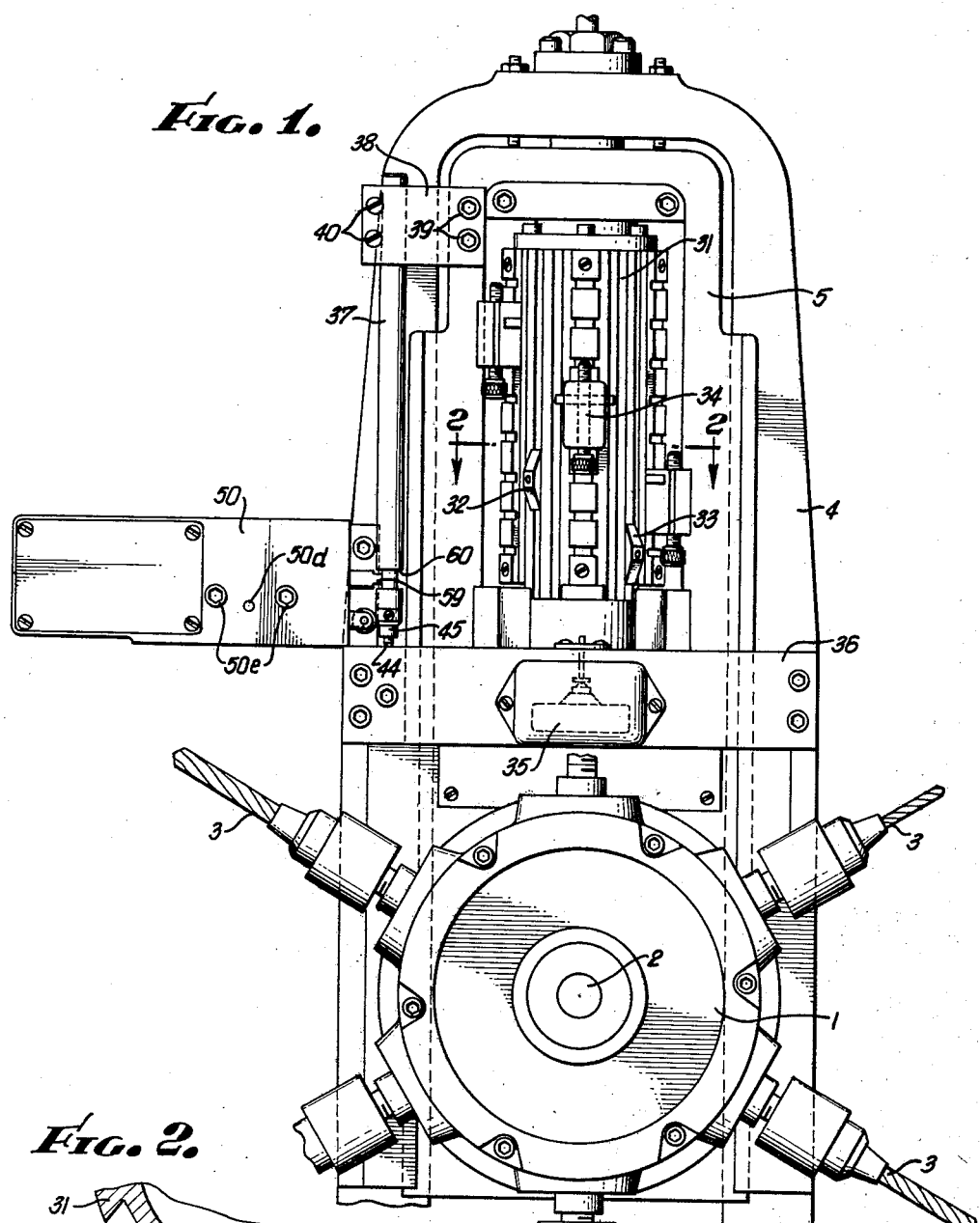
FIGURE 1 is a fragmentary front elevation of a machine tool embodying the invention, the structure being shown as it would appear prior to the start of a drilling operation.

The apparatus illustrated in FIG. 1 is similar to that disclosed in Patent No. 2,776,584, issued January 8, 1957, in the name of Fred G. Burg. The specific tool illustrated is a turret head drilling machine having a turret head 1. This head may be angularly adjusted about an axis 2 to position any one of a plurality of tools 3, such as drills or reamers, in a vertical direction to cooperate with work attached to a base carried by a frame 4.

The frame 4 also provides a guide for a vertically movable carriage or slide 5 as, for example, by the aid of a pair of dovetailing ribs 6 at opposite sides of the yoke-shaped frame 4 (FIGS. 3 and 4). The ribs 6 extend into longitudinal grooves or channels appropriately formed by the frame structure.

The particular mechanism for properly mounting the head 1 upon the carriage or slide 5 is immaterial so far as the present invention is concerned. It is sufficient to note that the slide is caused to be fed downwardly by the aid of a hydraulic or mechanical drive, and to be moved upwardly when it is desired to disengage any of the tools 3 from the work.

The main function of the present apparatus can be best explained by the aid of FIG. 8. In this figure, the horizontal line 7 corresponds to the position of the carriage or slide 5 when the carriage or slide is at the top of its stroke. The solid lines of the diagram illustrate fast downward or upward feed, and the dotted lines indicate slow feed.

Thus, for example, the solid vertical line 8 illustrates the first movement of the carriage corresponding to the approach of a tool 3 to the work. This downward movement is relatively fast and continues at a fast rate only to bring the forward point of the tool to the point 9, spaced only a short distance from the top 10 of the work piece to be operated upon.

The dotted line 11 indicates a slow down feed, corresponding to the first step of the drilling operation to a depth 11a. When a definite depth is reached, corresponding to line 11a, the tool is retracted, as indicated by the full line 12 at a rapid rate. This fast retraction continues until the tool clears the work to a point corresponding to position 13. Then the direction of the tool is reversed, as indicated by the full line 14, until the previous depth 11a is approached, corresponding to a point 15. The dotted line 16 indicates a slow down feed to continue the drilling to a depth corresponding to the line 17. A consequent fast upward movement is indicated by the full line 18, which again continues until the tool reaches a point 19 slightly above the top 10 of the work piece. After this point is reached, there is again a fast downward movement, as indicated by full line 20, continuing to a point 21 slightly above the bottom of the hole. A slow feed then occurs, as indicated by the dotted line 22, until a depth corresponding to line 23 is reached.

This is succeeded by a fast upward movement corresponding to line 24, continuing as before to a point 25 slightly above the top of the work piece. The full line 26 indicates fast downward feed to a point 27 just before the level 23 is reached. The bottom line 28 continues in this instance until the desired ultimate depth is attained, as represented by the horizontal line 29.

At this time, as represented by the full line 30, the tool is moved rapidly upwardly to the top of the frame.

This reciprocation of the tool 3 into the work is effective to maintain the drill or other tool in proper working condition without being clogged with chips or the like.

Figure 9:
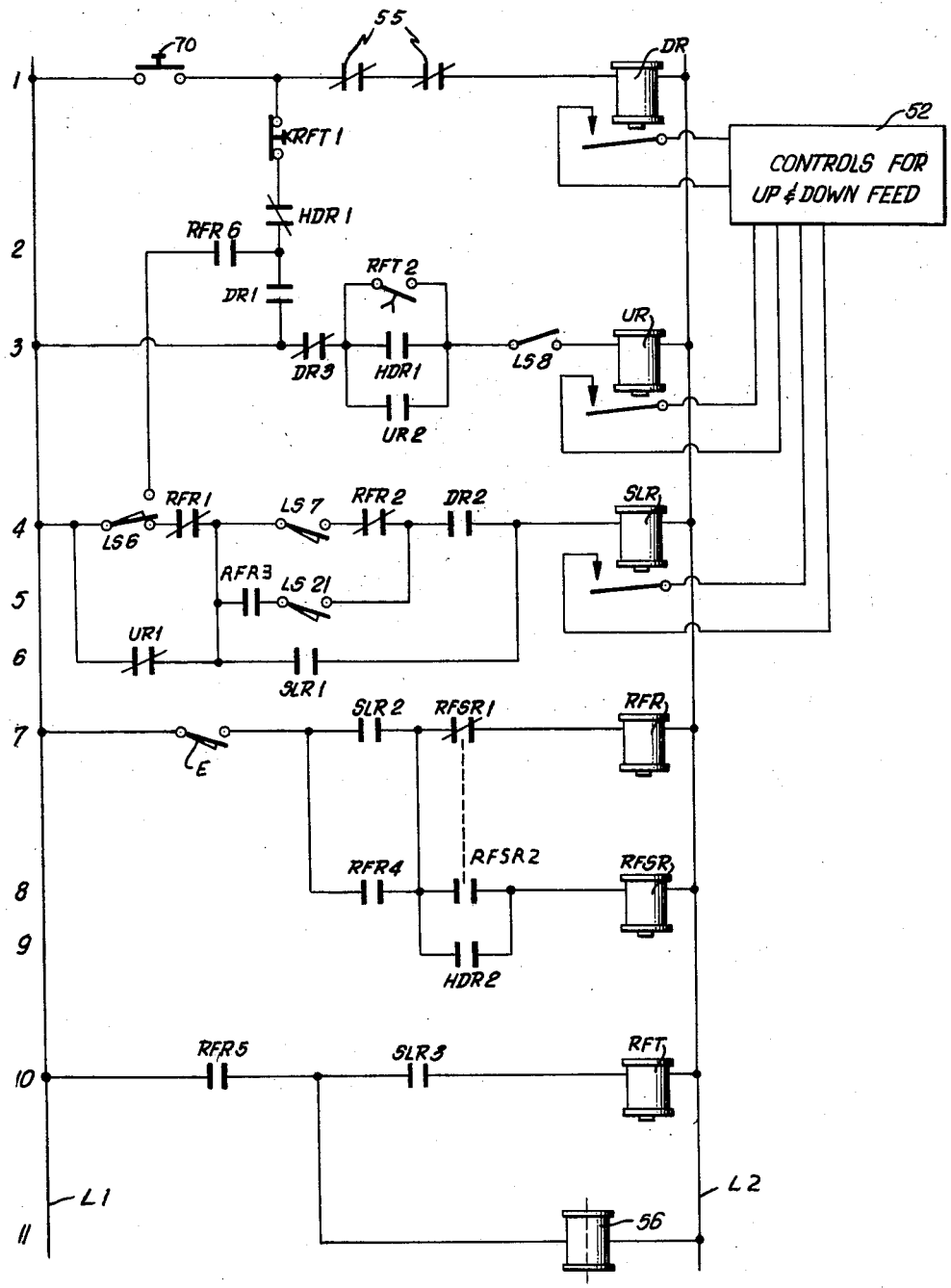
FIG. 9 is a schematic wiring diagram of the control mechanism for the system.

According to the present invention, the reciprocations of the tool are obtained automatically by the aid of electric circuits, particularly as shown in FIG. 9.

Figure 2:
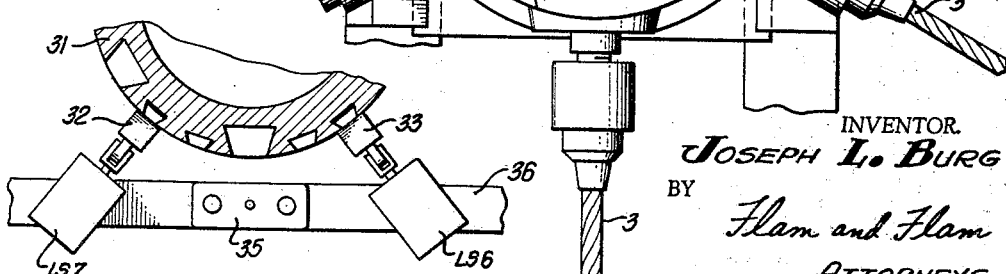
FIG. 2 is a fragmentary cross-sectional view, taken along a plane corresponding to line 2—2 of FIG. 1.

Thus, in the beginning position illustrated in FIGS. 1, 2 and 3, the carriage 5 also mounts a drum structure 31. This structure is angularly adjustable in steps on an axis normal to the axis 2. The adjustment is synchronized to the adjustment of head 1, so that the drum position corresponds with the particular tool 3 which may be active, all as explained in said prior Burg patent.

The drum structure 31 carries cams 32 and 33 which operate circuit controllers, as hereinafter described. They determine particular portions of the cycles of operation of the device. These cams have opposed inclined faces to provide operation of switches as the cams move vertically. Furthermore, they are adjustably mounted in longitudinal dovetail grooves in structure 31.

The conclusion of the drilling operation corresponding to the depth 29 (FIG. 3) is effected by a stop mechanism 34 also adjustably mounted in a slot in drum structure 31. This adjustable stop mechanism operates a switch structure 35 mounted on a cross rail 36 on the frame 4. The stop 34 is so adjusted that the switch is operated by it when the tool 3 reaches the desired ultimate depth in the work.

A rod 37 (see also FIG. 5) is arranged to be frictionally engaged by a friction clamp member 38 mounted upon the carriage 5, as by the aid of machine screws 39. The frictional restraint against movement of the rod 37 is adjusted by adjustment of screws 40 (FIG. 5) which extend across a cleft 41 formed in the member 38. Encircling the rod 37 are a pair of interrupted friction rings 42 that are held in place against inadvertent removal by pins 43 having enlarged heads overlapping the exposed edges of these rings 42. These pins 43 have a drive fit in the member 38.

The bottom of the rod 37 carries a feeler or stop member 44 (FIG. 7). This member 44 is threadedly adjustable in a supporting member 45 telescoping over a reduced portion 46 at the bottom of the rod 37. This member 45 has a sloping annular shoulder 47 operating as a cam upon a roller 48. This roller is rotatably mounted upon the end of a rod 49. This rod is slidable in a guide block 50 that is attached, as by bracket 50a (FIG. 4), to the standard 4. With the device in the beginning position of FIG. 3, the rod 49 is moved to the left against the force of spring 51. This spring is located in a counterbore 50b surrounding the guiding aperture 50c for rod 49. A cross pin 50d operates on a flat portion of rod 49 to prevent angular movement of the rod.

Screws 50e hold the block 50 to bracket 50a; and screws 50f hold the bracket 50a to the frame 5. A washer or collar 50g is mounted on rod 49 against which spring 51 may bear.

Mounted on the bottom wall of a recess 50h in block 50 is a circuit controller or snap action switch LS21 that is operated to closed position by rod 49 when it is in the position of FIG. 3. Upon release of rod 49 by cam surface 47, the switch is opened by movement of the rod to the right under the influence of spring 51.

At the beginning of the operation, closing of switch LS21 starts downward movement of slide 5; the rod or feeler 37 being prevented by tip 44 from downward movement, remains stationary and friction rings 42 simply slide on the rod 37.

Referring to FIG. 9, the controls for up and down as well as for the rate of feed are diagrammatically shown by the block 52. The mains supplying appropriate control current are represented by the reference characters L1 and L2. An electromagnet coil DR is caused to be energized across these mains either automatically or manually, as by a signal from a tape, a dial, or by operating a switch or push button 70. Included in the circuit for the coil DR are one or more emergency switches 55 for causing the downward movement to stop whenever an emergency arises. These emergency switches are of course optional and do not in themselves form any part of the invention.

To make it possible readily to trace the control circuits, line numbers from 1 to 11 appear at the left-hand side of the diagram. The various relay coils, such as DR, are also shown diagrammatically. Relay contacts operated by these coils are shown as either normally open or closed in the usual manner and designated by the corresponding letter of the coil with which the contacts are associated, and a member distinguishing it from other contacts operated by the same relay coil.

The circuit controller 70 energizing the circuit in line 1 need be operated only momentarily. There is a holding circuit consisting in line 2½ of relay contacts DR1 closed in response to energization of coil DR, normally closed contacts HDR1, and normally closed circuit controller RFT1. Until the circuit controller RFT1 is opened by energization of a reciprocating feed timer relay RFT (line 10 of FIG. 9), the down feed continues.

The first result of the energization of the circuit for the coil DR is the operation of the controls 52 for causing the head 1 to move downwardly at a fast rate. This rate continues until cam 32 (FIG. 2) closes switch LS7 momentarily just when the tool is close to the work. This corresponds to point 9 of the diagram of FIG. 8. When this occurs, the slow rate relay coil SLR in line 4 is energized. This circuit will now be traced. Thus a switch LS6 (see FIG. 2) is in the closed position; switch LS7 is also momentarily closed; contacts RFR1 and contacts RFR2 are normally closed and contacts DR2 are closed by energization of coil DR. The coil SLR has a sealing or holding circuit through contacts UR1 (due to deenergization of up relay UR), and contacts SLR1 (line 6) of the slow rate relay SLR. Accordingly, this coil remains energized and is kept energized until coil UR (line 3) is energized to cause the head 1 to be moved at a fast rate upwardly. Contacts RFR1 and RFR2 are closed until reciprocating feed coil RFR is energized. The slow rate relay coil shown in line 4 of FIG. 9 when energized causes the downward feed to be effective at a lower rate corresponding to the drilling operation.

The reciprocating feed relay coil RFR in line 7 is energized as soon as relay coil SLR is energized, by way of switch E, contacts SLR2, and normally closed contacts RFSR1 of reciprocating feed stop relay RFSR. A holding circuit by-passing contacts SLR2 includes contacts RFR4. Thus reciprocating feed control relay RFR remains energized while switch E is kept in closed position (optionally operable to provide reciprocating feed control) and while reciprocating feed stop relay coil in line 8 remains deenergized.

Just as soon as reciprocating feed relay coil RFR is thus energized, the contacts RFR1 and RFR2 open, so as to cause energization of the slow rate relay coil SLR to be effected through the holding circuit UR1 and SLR1.

Thus the slow rate relay SLR continues to operate until the holding circuit for coil SLR is opened (line 6) at contacts UR1, which occurs when the up relay coil UR (line 3) is energized as hereinafter described.

Contacts RFR5 in line 10 are closed as soon as reciprocating feed relay coil RFR (line 7) is energized. This energizes the relay coil RFT (reciprocating feed timer) as well as a solenoid 56. This solenoid 56, as shown in FIGS. 3, 4 and 6, operates a pull rod 57 guided in block 50. A spring 58, similar to spring 51, normally urges the rod 57 and its locking extension 59 to lock the feeler rod 37. This locking extension engages in an annular groove 60 formed in the end of the rod 37, as shown in FIGS. 3 and 6. The retracted position of the locking bar 57 is indicated in FIG. 6. This locking bar remains unlocked until the end of the reciprocating feed operation.

Unlocking of rod 37 permits this rod to move upwardly (when the feed in reversed) so as to carry feeler 44 away from cross bar 36. Thus the slow rate relay coil SLR will be energized in a succeeding down movement only when the tool 3 reaches a position corresponding to point 15 of FIG. 8. All this occurs after the up or reverse relay UR (line 3) is active to cause slide 5 to move to correspond to point 13 of FIG. 8.

Returning now to the first slow feed period between point 9 and depth 11a, the reciprocating feed timer relay coil RFT in line 10 causes the holding circuit for down relay coil DR in line 1 to be interrupted after a time interval, by opening of contacts RFT1 in line 1½. These contacts are time delayed, after coil RFT in line 10 is energized. The slow feed thus stops at a depth in the work piece indicated by line 11 in FIG. 8.

In line 2½, time delay contacts RFT2 are also closed in order to energize up relay coil UR in line 3. This up relay coil energizes a circuit for reversing the feed and quickly to retract the tool 3 from the work. This coil can be energized only after coil DR drops out, due to relay contacts DR3 in line 3. At the same time, in line 6 the normally closed contacts UR1 are opened so as to deenergize the slow rate relay coil SLR in line 4. Accordingly, the upward movement of the tool 3 is at a rapid rate. A holding circuit for coil UR includes contacts UR2. Coil UR remains energized only until contacts DR3 open due to reenergization of coil DR, as hereinafter explained.

In response to the dropping out of slow rate relay SLR, the reciprocating feed timer coil RFT is deenergized by opening of contacts SLR3. Thus this timer coil can become active again only after coil SLR is reenergized.

It is thus seen that the reciprocating feed timer relay coil in line 10 causes opening of the down relay coil DR in line 1 and closing of the up relay coil UR in line 3 after an interval. A limit switch LS8 is included in the energizing circuit of coil UR, so as to cause opening of this circuit as hereinafter explained.

While coil UR in line 3 is energized, the slide 5 continues to move up at a rapid rate as represented by line 12 in FIG. 8. Cam 33 (FIGS. 1 and 2) is so set as to move switch LS6 momentarily upwardly when the tool 3 reaches a position corresponding to point 13. Previous downward movement of cam 33 only passes the switch LS6 which remains in the lower position of FIG. 6, line 4. As soon as cam 33 moves switch LS6 to its upper position, the circuit for coil DR is completed, and the circuit for coil UR is opened. This movement of switch LS6 need be only momentary; the closed circuit for coil DR includes contacts RFR6, which are closed, contacts HDR1, contacts RFT1 (since coil RFT, line 10 is deenergized), switches 55, and coil DR. The circuit for coil UR is interrupted as soon as coil DR is energized, at contacts DR3 in line 3. Holding contacts DR1 (line 2½) maintain coil DR energized even after switch LS6 returns to the position shown.

At the time that the carriage 5 is moved upwardly in response to the energization of up relay coil UR in line 3, the rod 37 is lifted from the cross bar 36 and assumes a position above the bar 36 corresponding to the depth penetrated into the work piece during the first operation.

Downward movement at a rapid rate now occurs until the switch LS21 is operated by the downward movement of cam member 45 at the end of rod 37 (FIGS. 1 and 7). The feeler 44 must move to engage bar 36 through a longer distance before this happens at point 15 of FIG. 8, because the rod 37 has been moved upwardly relative to friction block 38 (FIG. 6) by an amount corresponding to the vertical distance between point 9 and the bottom surface 11a of FIG. 8.

Switch LS7 is ineffective because contacts RFR2 are open. Thus the slow rate of feed begins just above the bottom surface 11a. The feeler 44 is thus progressively adjusted during the slow rate feed, beginning when the feeler contacts bar 36.

The slow rate relay SLR will continue to operate until the reciprocating feed timer coil RFT in line 10 causes delayed opening of contacts RFT1 in line 1½. Coil RFT is energized through contacts SLR3. The timer contacts RFT1 and RFT2 in lines 1½ and 2½ now operate, as before, to reverse the direction of the head movement and to terminate the up movement when switch LS6 is moved, as before, to cause reenergization of relay coil DR in line 1 and deenergization of the coil UR in line 3.

From there on, the cycles repeat to cause subsequent reciprocating feed, as shown in FIG. 8; in these recurring cycles, the feeler 44 is adjusted by sliding of block 38 on the rod 37 as soon as slow rate feed is reached. Since the feeler adjustment is equal to the increment of new drilling at the end of the slow feed period, the feeler 44 assures that the slow feed for the next period begins always at a slight distance from the bottom of the hole. However, when the required depth 29 is reached, the apparatus returns to the position of FIG. 1; the solenoid 56 is released to relock the rod 37 and thereby to cause the rod to assume the starting position.

Thus stop 34 (FIG. 1) operates switch 35 in response to the down movement of head 1 to a desired depth 29 (FIG. 8). This switch operates a relay having contacts HDR1 in line 3 and HDR2 in line 9. Contacts HDR2 energize reciprocating feed stop relay coil RFSR in line 8. This energizing circuit includes the closed manual switch E in line 7, closed contacts RFR4 in line 8, and contacts HDR2 in line 9. As soon as coil RFSR is energized, it opens the circuit for coil RFR in line 7, via contacts RFSR1; and completes a holding circuit through contact RFSR2 in line 8. As soon as coil RFR is thus deenergized, the contacts RFR5 in line 10 open and deenergize coil 56 in line 11, as well as coil RFT in line 10. As before stated, this relocks the rod 37.

At the same time, the up feed relay coil UR in line 3 is energized by contacts HDR1, and through holding contacts UR in line 3½. This circuit is finally opened by an appropriate limit switch LS8 when the slide 5 reaches its upper position corresponding to line 7 of FIG. 8.

When it is desired to operate a tool in another part of the work piece, the operation is started as before.

The inventor claims:

In a machine tool of the class including a frame, a carriage mounted on the frame for reciprocating movement in a path; said carriage having a limited retracted position; a head mounted on the carriage for indexing movement about an axis transverse to said path; angularly spaced rotary tool holders arranged about the axis of adjustment of the head whereby tools may be selectively placed in operating position; a support mounted on the carriage for adjustment about an axis, and synchronously coupled to said head whereby the support is indexed with the head; a down relay for causing the carriage to move away from its retracted position; an up relay for causing the carriage to return toward its retracted position; a slow rate relay for causing the carriage to move at a reduced rate; a pair of circuit controllers carried by the frame, one of said circuit controllers having normally closed contacts and normally open contacts, and the other of said circuit controllers having normally open contacts; a number of pairs of cams for said circuit controllers and adjustably mounted on said support so that successive pairs of cams are positioned for movement in paths respectively to operate said circuit controllers corresponding to successive indexed positions of said head, said one of said circuit controllers being operated as the tool substantially clears the works, and the other circuit controller being operated when the tool closely approaches the work and in accordance with the setting of said cams; a depth limit switch having normally closed contacts and normally open contacts; a number of depth cams adjustably mounted on said support so that successive depth cams are positioned for movement in a path to operate said depth switch corresponding to successive indexed positions of said head; a normally closed up limit switch moved to open position when the carriage is in its retracted position; an energization circuit for said down relay including a normally open start switch; a holding branch paralleling said start switch including, in series, said normally closed contacts of said depth limit switch and a normally open circuit controller closed by said down relay; an energization circuit for said up relay including, in series, a normally closed circuit controller opened by said down relay, said normally open contacts of said depth limit switch and said normally closed up limit switch; a holding branch paralleling said normally open contacts of said depth limit switch including normally open contacts closed by said up relay; an energization circuit for said slow rate relay, including, in series, the normally closed contacts of said one of said pair of circuit controllers, the normally open contacts of said other of said pair of circuit controllers, and normally open contacts closed by said down relay; a holding circuit for said slow rate relay paralleling said normally open contacts of said other of said pair of circuit controllers and said normally open contacts closed by said down relay, said holding circuit being dependent upon said normally closed contacts of said one of said pair of circuit controllers, the combination therewith of: a depth sensing structure including a first part mounted on the carriage, a second part yieldingly gripped by the first part, and an abutment mounted on the frame and in the path of movement of the second part as the carriage is advanced to cause the parts to move with respect to each other whereby the relative position of said parts senses the previous tool penetration; a stop relay; a reciprocating feed relay; an energization circuit for the reciprocating feed relay including a switch for selecting reciprocating feed, normally open contacts closed by said slow rate relay and normally closed contacts of said stop relay; a holding circuit for said reciprocating feed relay paralleling said normally open contacts of said slow rate relay, and including normally open contacts closed by said reciprocating feed relay; an electrically energizable timer reset upon deenergization thereof; an energization circuit for said timer including, in series, normally open contacts closed by said reciprocating feed relay and normally open contacts closed by said slow rate relay; normally closed contacts opened by said timer after the passage of a time interval following continued energization thereof and serially inserted in the holding branch for said down relay; normally open contacts closed by said timer after the passage of time following continued energization thereof and paralleling said normally open contacts of said depth limit switch; first normally closed contacts opened by said reciprocating feed relay serially associated with said normally closed contacts of said one of said pair of circuit controllers and upon which said holding circuit for said slow rate relay is dependent; second normally closed contacts opened by said reciprocating feed relay serially associated with the normally open contacts of said other of said pair of circuit controllers and paralleled by said holding circuit for said slow rate relay; a supplemental energization circuit for said down relay, including said normally open contacts of said one of said pair of circuit controllers and normally open contacts closed by said reciprocating feed relay, said supplemental energization circuit being dependent upon said normally closed contacts of said depth limit switch; a supplemental energization circuit for said slow rate relay including normally open contacts closed upon movement of said second part against said abutment, normally closed contacts opened by said up relay and paralleling said normally closed contacts of said one of said pair of circuit controllers with its serially associated normally closed contacts opened by said reciprocating feed relay, said supplemental energization circuit further including normally open contacts closed by said reciprocating feed relay; an energization circuit for said stop relay, including, in series, normally open contacts of said depth limit switch, the normally open holding contacts of said reciprocating feed relay and said selector switch; a holding circuit for said stop relay paralleling said normally open contacts of said depth limit switch, including normally open contacts closed by said stop relay; and means for confining said second part against said abutment only when said reciprocating feed relay is deenergized.

References Cited in the file of this patent

UNITED STATES PATENTS

| 2,324,727 | Shartle | July 20, 1943 |
| 2,488,620 | Evenstad et al. | Nov. 22, 1949 |
| 2,776,584 | Burg | Jan. 8, 1957 |